US012380785B1

(12) United States Patent
Kelsch et al.

(10) Patent No.: US 12,380,785 B1
(45) **Date of Patent: *Aug. 5, 2025**

(54) ANTI-THEFT DEVICE FOR ELECTRONIC MERCHANDISE UTILIZING WIRELESS VERIFICATION

(71) Applicants: Christopher A. Kelsch, Palm Harbor, FL (US); Vanguard Products Group, Inc., Oldsmar, FL (US)

(72) Inventors: Christopher A. Kelsch, Palm Harbor, FL (US); Francesc Agustin, Clearwater, FL (US); Lee Eckert, Sarasota, FL (US); Wade Zhu, Land O' Lakes, FL (US); William Claude Chazotte, Indian Rocks Beach, FL (US); Robert Ekle, Land O' Lakes, FL (US)

(73) Assignee: Vanguard Products Group, Inc., Oldsmar, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/495,037

(22) Filed: Oct. 26, 2023

Related U.S. Application Data

(63) Continuation-in-part of application No. 18/303,398, filed on Apr. 19, 2023, now Pat. No. 11,869,323.

(60) Provisional application No. 63/332,510, filed on Apr. 19, 2022.

(51) Int. Cl.
*G08B 13/24* (2006.01)
*G08B 5/38* (2006.01)

(52) U.S. Cl.
CPC .......... *G08B 13/2417* (2013.01); *G08B 5/38* (2013.01)

(58) Field of Classification Search
CPC .............................. G08B 13/2417; G08B 5/38
See application file for complete search history.

(56) References Cited

U.S. PATENT DOCUMENTS 7,190,264 B2 * 3/2007 Brown .............. G08B 13/1418 340/687
7,209,038 B1 * 4/2007 Deconinck ......... G08B 13/1445 340/568.1

(Continued)

*Primary Examiner* — Nay Tun
(74) *Attorney, Agent, or Firm* — Andriy Lytvyn; Hill Ward Henderson, P.A.

(57) ABSTRACT

An anti-theft device for securing an electronic merchandise against theft. When the electronic merchandise is placed onto a charging platform, the inductive coil within the charging platform of the anti-theft device establishes a wireless connection with an inductive coil within the electronic merchandise. When the electronic merchandise is removed from the charging platform, an alarm is armed. Upon the electronic merchandise being returned to the charging platform, the inductive coil within the charging platform reestablishes the wireless connection with the inductive coil of the electronic merchandise and obtains an identification data therefrom. If the obtained identification data corresponds to the identification data pre-programmed into the anti-theft device, the alarm is disarmed. Otherwise, if the electronic merchandise is not returned to its designated charging platform and its identification data is successfully verified prior to expiration of a predefined duration, an alarm may be triggered.

27 Claims, 5 Drawing Sheets

(56) References Cited

U.S. PATENT DOCUMENTS

| | | | | | |
|---|---|---|---|---|---|
| 8,212,672 | B2 * | 7/2012 | Brenner | G09F 27/00 340/568.1 |
| 8,525,688 | B2 * | 9/2013 | Chatterjee | G08B 13/1409 340/686.1 |
| 8,878,673 | B2 * | 11/2014 | Grant | G08B 13/1427 340/568.1 |
| 9,019,103 | B2 * | 4/2015 | Tedesco | G08B 13/1427 340/568.1 |
| 9,773,401 | B1 * | 9/2017 | Auvenshine | H04W 4/38 |
| 10,223,881 | B2 * | 3/2019 | Burtness | G08B 13/1427 |
| 2012/0176249 | A1 * | 7/2012 | Chatterjee | G08B 13/1409 340/686.6 |
| 2013/0328661 | A1 * | 12/2013 | Phillips | G07C 9/00912 715/769 |
| 2014/0298447 | A1 * | 10/2014 | Chu | H02J 50/80 726/18 |
| 2015/0091729 | A1 * | 4/2015 | Phillips | G08B 13/149 340/568.2 |
| 2018/0047263 | A1 * | 2/2018 | Burtness | G08B 13/1427 |
| 2018/0166907 | A1 * | 6/2018 | Chiu | H02J 50/10 |
| 2019/0296590 | A1 * | 9/2019 | Chae | H02J 7/02 |
| 2020/0334352 | A1 * | 10/2020 | Nguyen | G07C 9/00682 |
| 2021/0273491 | A1 * | 9/2021 | Lee | H02J 50/402 |
| 2024/0164349 | A1 * | 5/2024 | Mort | A61B 5/6831 |

* cited by examiner

ANTI-THEFT DEVICE FOR ELECTRONIC MERCHANDISE UTILIZING WIRELESS VERIFICATION

PRIORITY CLAIM

This non-provisional patent application is a continuation-in-part of and claims priority to U.S. Non-Provisional application Ser. No. 18/303,398 filed on Apr. 19, 2023, which claims priority to U.S. Provisional Application No. 63/332,510 filed on Apr. 19, 2022.

BACKGROUND OF THE INVENTION

1. Field of the Invention

This invention relates to merchandise anti-theft devices. More specifically, it relates to an anti-theft device having a wireless merchandise identification function.

2. Brief Description of the Related Art

Retailers often prefer to present their merchandise to consumers in a manner that allows the consumers to touch, inspect, and otherwise interact with the products at a display counter. Many merchandise items, especially portable electronic gadgets, are relatively expensive and, therefore, are under a serious threat of theft. Retailers often face a dilemma pertaining to how to interactively display their merchandise to attract customers and increase sales, while, at the same time, safeguarding the merchandise against theft.

Many types of anti-theft devices are known in the art. Some anti-theft solutions involve brackets that secure an electronic merchandise and anchor it to the display counter. Others involve protective sheaths and cases. However, such anti-theft devices detract from a true hands-on customer experience with the electronic merchandise. For this reason, there is a strong demand for an anti-theft solution that enables customer interactions with the electronic merchandise in its true form, unencumbered by a permanently attached mechanical security measure that alters the weight and feel of the electronic merchandise, while safeguarding the electronic merchandise against unauthorized removal from the retail store premises.

DESCRIPTION OF THE DRAWINGS

For a fuller understanding of the invention, reference should be made to the following detailed description, taken in connection with the accompanying drawings, in which.

SUMMARY OF THE INVENTION

Figure 1:
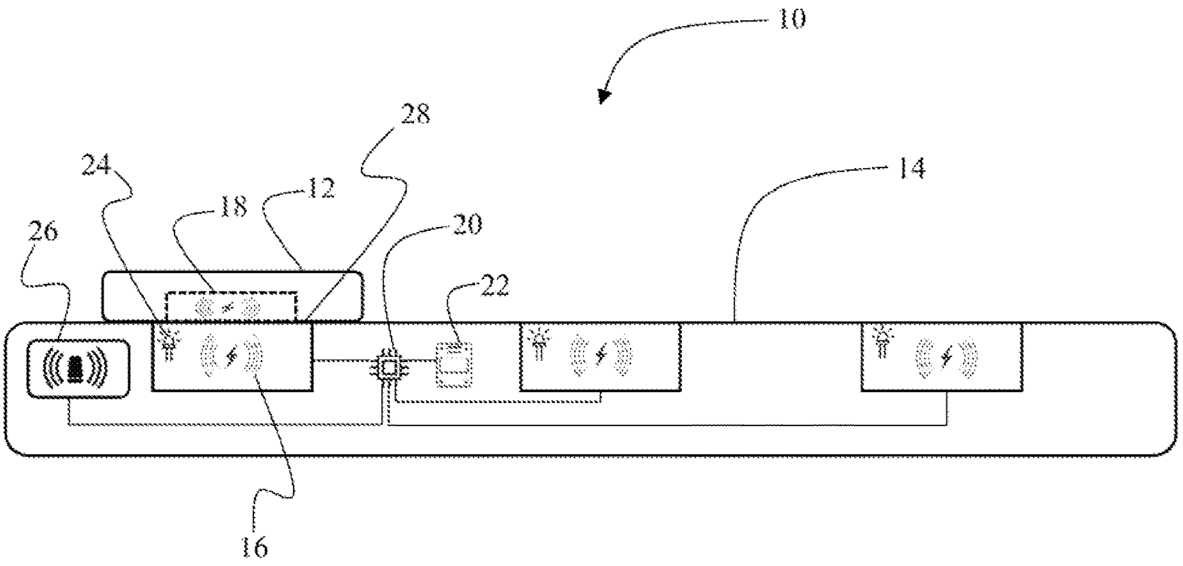
FIG. 1 is a schematic side view depicting an article of electronic merchandise positioned on a charging platform, wherein the charging platform is configured to receive identification data pertaining to the electronic merchandise by wirelessly interacting therewith.

In an embodiment, the invention pertains to an anti-theft device for securing an article of electronic merchandise. The anti-theft device includes a wireless charging platform configured to support the article of electronic merchandise. A wireless connection device is disposed within the wireless charging platform. The wireless connection device may be an inductive coil or an antenna. The wireless connection device is configured to establish a wireless connection with a corresponding wireless connection device (e.g., an inductive coil or antenna) of the electronic merchandise. The wireless connection enables the wireless connection device of the anti-theft device to obtain an identification data string from the article of electronic merchandise placed onto the charging platform. The identification data string may encode information related to a manufacturer, a model, or a characteristic of the article of electronic merchandise.

The anti-theft device may further include a processor and a non-transitory computer-readable medium communicatively coupled with one another. The identification data string associated with the specific article of electronic merchandise may be stored on the non-transitory computer-readable medium and can be accessed by the processor. In an embodiment, the processor is configured to verify whether the identification data string wirelessly obtained from the article of electronic merchandise placed onto the charging platform of the anti-theft device corresponds to the pre-programmed identification data string stored on the computer-readable medium.

The anti-theft device may also include an alarm device. The alarm device may be armed upon removal of the article of electronic merchandise from the wireless chagrining platform and may be disarmed in response to the processor successfully verifying that the identification data string wirelessly obtained from the article of electronic merchandise replaced onto the charging platform corresponds to the pre-programmed identification data string stored within the non-transitory computer-readable medium.

In an embodiment, the anti-theft device includes a light source configured to emit a light response to the first wireless connection device establishing or losing the wireless connection with the electronic merchandise. The light source may be configured to emit a first color light (for example, green) or a flashing sequence in response to successfully verifying that the identification data string wirelessly obtained from the article of electronic merchandise corresponds to the pre-programmed identification data string. The light source may be further configured to emit a second color light (for example, red) or a second flashing sequence if the identification data string obtained from the article of electronic merchandise does not correspond to the pre-programmed identification data string.

In an embodiment, the invention pertains to a method of securing an article of electronic merchandise against theft.

This method involves the step of providing a wireless charging platform having a first wireless connection device. The wireless charging platform may be configured to wirelessly supply electrical power to the article of electronic merchandise and/or to wirelessly obtain data therefrom. In an embodiment, a unique identification data string associated with the article of electronic merchandise is provisioned into a non-transitory computer-readable storage medium associated with the anti-theft device.

When the article of electronic merchandise is removed from the wireless charging platform, an alarm device may be armed. Subsequently, when the article of electronic merchandise is returned to the wireless charging platform, the wireless connection device within the charging platform will establish a wireless connection with the article of electronic merchandise and will obtain an identification data string therefrom via the wireless connection. The identification data string obtained from the article of electronic merchandise will then be compared against the pre-programmed identification data string provisioned to the wireless platform to determine whether they match. If the verification process is successful, the alarm device is disarmed.

In an embodiment, the wireless connection device of the anti-theft device and the wireless connection device of the electronic merchandise comprise antennas configured to communicate with one another using a near-field communication (NFC) protocol, a short-range wireless communication protocol (i.e., BLUETHOOTH® or BLUETOOTH® LE), an ultra-wideband (UWB) protocol, a low-power, wide area networking (LoRaWAN) protocol, a radio frequency identification (RFID) protocol, or a sub-gigahertz radio technology.

In an embodiment, the anti-theft device may be configured to determine a battery specification of the electronic merchandise based on the identification data string and may be configured to adapt the electrical power wirelessly supplied to the electronic merchandise based on the battery specification.

In addition, the anti-theft device may be configured to transmit a command to the electronic merchandise via the wireless connection established between their respective wireless connection devices, wherein the transmitted command may be configured to trigger the article of electronic merchandise to perform a specific function, such as deleting a file, initiating an update, changing a setting, launching an application, or downloading or uploading data via a network connection. Payload data may also be transmitted between the anti-theft device and the electronic merchandise via the wireless connection between their respective wireless connection devices. In an embodiment, the command may be configured to trigger a software application pre-installed on the electronic merchandise to cause the electronic merchandise to output a visual or audible signal indicating that the electronic merchandise was not returned to its designated platform.

In an embodiment, the anti-theft device may be configured to track the time elapsed from removal of the article of electronic merchandise from the wireless charging platform until the article of electronic merchandise is replaced onto the wireless charging platform.

DETAILED DESCRIPTION OF THE PREFERRED EMBODIMENT

In the following detailed description of the preferred embodiment, reference is made to the accompanying drawings, which form a part hereof, and within which specific embodiments are shown by way of illustration by which the invention may be practiced. It is to be understood that other embodiments may be utilized and structural changes may be made without departing from the scope of the invention.

FIG. 1 depicts an embodiment of an anti-theft device 10 for electronic merchandise 12. The anti-theft device 10 utilizes wireless charging and wireless identification technology to ensure that the electronic merchandise 12 is timely returned to its designated location after a customer interaction therewith. In an embodiment, the anti-theft device 10 includes an inductive wireless charging platform 14, which houses one or more wireless connection devices 16—for example, inductive coils or antennas. The following description refers to an inductive coil 16 as a non-limiting and a non-exclusive example of a wireless connect device.

FIG. 1 depicts the electronic merchandise 12 resting on its designated placement 28 on the wireless charging platform 14. When the electronic merchandise 12 is placed correctly in its designated placement 28, the inductive coil 16 communicates with an inductive coil 18 built into the electronic merchandise 12. This electromagnetic communication between the inductive coils 16 and 18 enables the charging platform 14 to wirelessly supply power to the electronic merchandise 12. An example of a wireless charging standard is Qi protocol.

The anti-theft device 10 may be configured to identify the type of electronic merchandise 12—e.g., a smartphone, stylus, smartwatch, headphones, etc.—based on the wireless charging protocol thereof. The inductive charging coil 16 of the charging platform 14 may be adapted to supply electric power to the electronic merchandise 12 using its preferred or required wireless charging protocol. In addition, the amount of power delivered to the electronic merchandise 12 may be optimized based on its type—for example, a stylus may require less power than a smartphone. In this manner, the charging platform 14 can provide universal charging capability to a wide array of electronic devices by selecting the appropriate wireless charging protocol for each electronic merchandise 12 placed onto the charging platform 14.

In addition to wirelessly supplying power to the electronic merchandise 12, the inductive coil 16 of the charging platform 14 may be further configured to receive identification data—for example, a singulated identification number—from the electronic merchandise 12. This identification data can be unique to every article of electronic merchandise 12, thereby enabling the charging platform 14 to confirm that the correct electronic merchandise 12 has been placed thereon. Furthermore, the identification data string may be decoded to identify the manufacturer, the model, and other aspects (for example, color variant) of the electronic merchandise 12.

FIG. 1 depicts that the inductive coil 16 may be communicatively coupled to a processor 20. In this manner, the identification data string that the inductive coil 16 obtains via wireless connection with the inductive coil 18 can be communicated from the inductive coil 16 to the processor 20. FIG. 1 further depicts that the processor 20 is communicatively coupled to a non-transitory computer-readable medium 22. Within the context of this specification, the term "non-transitory computer-readable medium" encompasses electronic, magnetic, optical, electromagnetic, infrared, or semiconductor system, apparatus, or device, or any suitable combination of the foregoing and may be located locally or hosted on a remote server.

The identification data associated with a specific article of electronic merchandise 12 may be stored within the computer-readable medium 22. As described in greater detail below, the processor 20 may be configured to compare the identification data obtained wirelessly from the article of merchandise 12 against the pre-programmed identification data stored within the computer-readable medium 22. In this manner, the processor 20 can verify whether the article of electronic merchandise 12 that is placed onto the charging platform 14 is indeed the article that is intended to be secured by the anti-theft device 10.

In an embodiment, the charging platform has a light source 24—for example, a light-emitting diode (LED)—capable of emitting light of different colors, flashing sequences, etc. The light source 24 may be configured to emit a light of a predefined color when the electronic merchandise 12 is removed from the charging platform 14, alerting the store personnel of an ongoing consumer interaction with the electronic merchandise 12. Upon return of the electronic merchandise 12 onto the charging platform 14, the inductive coil 16 of the charging platform 14 will establish a wireless connection with the inductive coil 18 of the electronic merchandise 12. The inductive coil 16 will obtain the identification data from the electronic merchandise 12 via this wireless connection between inductive coils 16 and 18. Next the processor 20 may be configured to compare the obtained identification data against the pre-programmed identification data stored in the computer-readable medium 22. The light source 24 may be configured to emit a light of a first color (for example, green) in response to a successful verification that the identification data wirelessly obtained from electronic merchandise 12 matches the pre-programmed identification data string stored within the non-transitory computer-readable storage medium 22. Otherwise, if the verification of the identification data string is unsuccessful, the processor 20 may be configured to cause the light source 24 to emit a light of a second color (for example, red).

In addition, the anti-theft device 10 may include an alarm device 26. As explained in more detail below, the alarm device 26 may be configured to output an alarm if the article of electronic merchandise 12 is not timely returned to its designated placement on the wireless charging platform 14 or if the verification of its identification data string is unsuccessful. The alarm may involve a sound, a light alert, a wireless signal transmitted to a designated device, or any other type of an alarm known in the art.

Furthermore, the charging platform 14 may include other types of wireless communication devices—for example, an antenna. In such embodiment, the antenna disposed within the charging platform 14 may be configured to communicate with a complementary antenna of the electronic merchandise 12. In an exemplary embodiment, these antennas may be configured to communicate with one another via a near field communications (NFC) protocol, a short-range wireless communication protocol (i.e., BLUETHOOTH® or BLUETOOTH® LE), an ultra-wideband (UWB) protocol, a low-power, wide area networking (LoRaWAN) protocol, a radio frequency identification (RFID) protocol, or a sub-gigahertz radio technology. Some types of electronic merchandise 12—for example, styli, wearable electronics, and audio accessories—may be charged wirelessly via NFC or another protocol that enables transfer of power and/or data between two closely positioned antennas. Wireless communication between the antennas within the charging platform 14 and the electronic merchandise 12 may enable the charging platform 14 to obtain the identification data from the electronic merchandise 12 and/or transmit payload data or other commands. Although the exemplary embodiment disclosed herein is described as using inductive coils 16 and 18, embodiments utilizing antennas as wireless communication devices to establish a wireless communication link between the charging platform 14 and the electronic merchandise 12 (for example, via NFC or another type of wireless communications protocol) also fall within the scope of the invention.

Figure 2A:
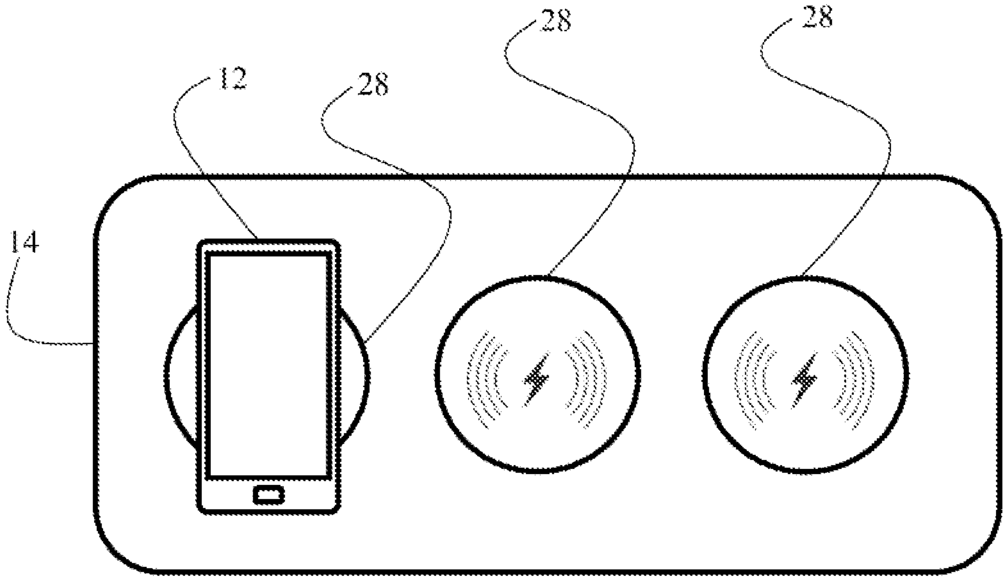
FIG. 2A is a schematic top view depicting an article of electronic merchandise positioned on a charging platform.
Figure 2B:
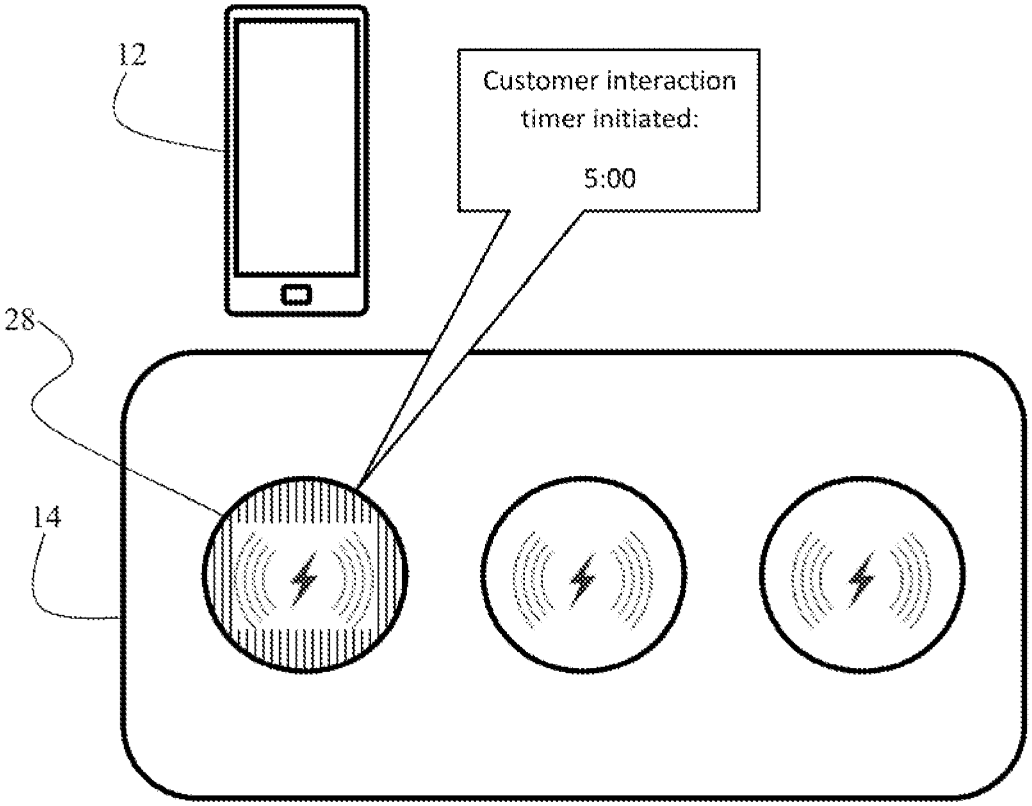
FIG. 2B is a schematic top view depicting a customer-interaction timer being activated in response to the electronic merchandise being lifted from the charging platform.

FIG. 2A depicts that the charging platform 14 may have multiple charging placements 28. Each charging placement 28 may be associated with a specific article of electronic merchandise 12. FIG. 2B depicts that when electronic merchandise 12 is picked up from the charging platform 14, its designated charging placement 28 may illuminate to indicate an ongoing customer interaction with the electronic merchandise 12.

Figure 2C:
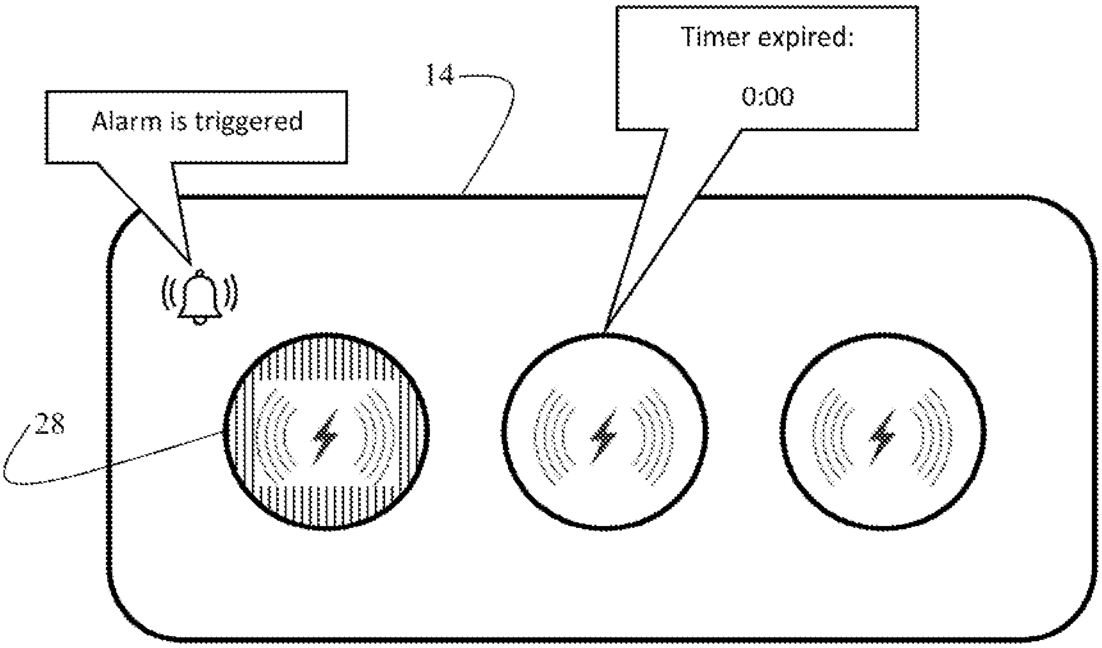
FIG. 2C is a schematic top view depicting an alarm being produced in response to the electronic merchandise not being returned to its proper position on the charging platform prior to expiration of a predefined duration allocated for the customer interaction.
Figure 2D:
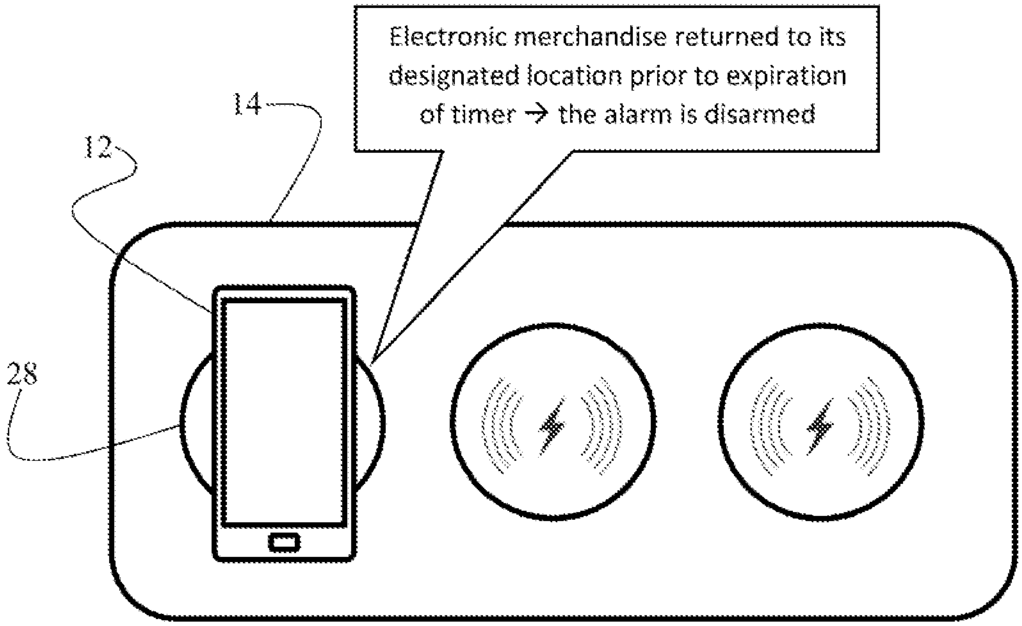
FIG. 2D is a schematic top view depicting the electronic merchandise being returned to its designated position on the charging platform prior to the expiration of the timer.

FIG. 2B depicts that, as a security measure, each customer interaction may be timed. A timer may be initiated for a predefined duration when electronic merchandise 12 is removed from its charging placement 28. FIG. 2C depicts that an alarm may be triggered if the electronic merchandise 12 is not returned to its proper charging placement 28 prior to expiration of the predefined duration. The alarm may involve a sound, a light alert, a wireless signal transmitted to a designated device, or any other type of an alarm known in the art. In this manner, the invention ensures that store personnel, law enforcement, and/or security guards are alerted when the electronic merchandise 12 is not timely returned to its designated charging placement 28. Because the charging platform 14 is configured to verify the identification data of the electronic merchandise 12, the interaction timer will be reset only when the exact article of electronic merchandise 12 designated for that specific charging placement 28 is returned there, as depicted in FIG. 2D. Placement of a different electronic merchandise on the charging placement 28 will not reset the interaction timer and will not disarm the alarm. Thus, this security feature cannot be circumvented by replacing one electronic merchandise 12 with another electronic device or a dummy.

Alternatively, or additionally, the electronic merchandise 12 may be configured to communicate a predefined security code to the charging platform 14 via the wireless connection link established between the inductive coils (or antennas) of the electronic merchandise 12 and the charging platform 14. This code may be used to arm/disarm the alarm. Also, the charging platform 14 may be configured to wirelessly communicate a security code to the electronic merchandise 12, which may lock/unlock the electronic merchandise 12, or cause the electronic merchandise 12 to perform a specific function.

Figure 2E:
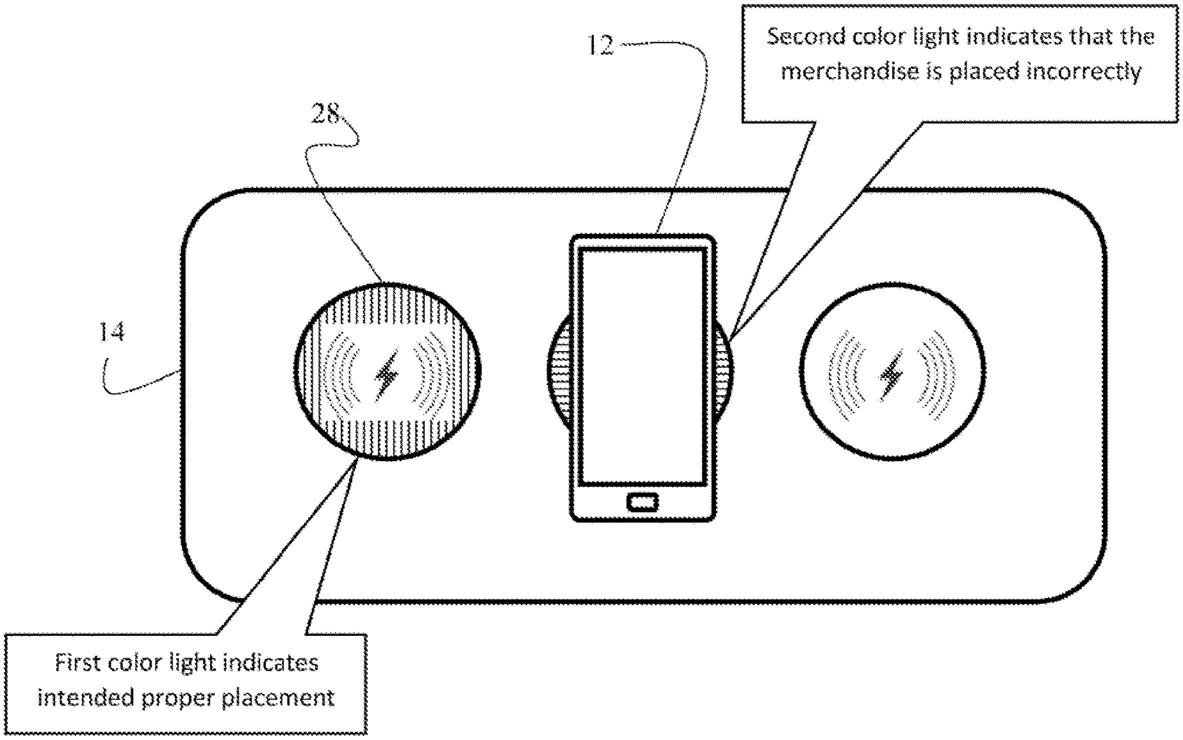
FIG. 2E is a schematic top view depicting an embodiment in which charging placements emit light intended to guide return of the electronic merchandise to its designated placement location.

FIG. 2E depicts that the charging platform 14 may be configured to encourage proper arrangement of articles of electronic merchandise 12 on the charging platform 14. FIG. 2E depicts an exemplary charging platform 14 having three wireless charging placements 28. Each placement 28 is associated with a specific electronic merchandise 12. If the electronic merchandise 12 designated for the first placement 28 is placed onto the second placement 28, the first placement 28 and/or second placement 28 may light up in predefined colors to indicate that the electronic merchandise 12 is incorrectly placed and should be moved to its proper placement. In an embodiment, each placement 28 may be configured to illuminate with a first designated color (for example, green) when a correct electronic merchandise 12 is placed thereon, and illuminate with a second designated color (for example, red) when an incorrect electronic merchandise 12 is placed thereon. In this manner, customers and store personnel will be encouraged to maintain the merchandise displayed in a proper designated positioning order. In another embodiment, rather than illuminating with color lights indicative of the proper placement of the electronic merchandise 12 on the charging platform 14, the designated charging placement 28 for the electronic merchandise 12 may emit a steady of flashing light.

In an embodiment, the invention may utilize an automated conveyor belt, pick-and-place device, or other means to deliver each electronic merchandise 12 to its designated display placement 28. In one such embodiment, when a customer places an electronic merchandise 12 onto a conveyor belt, the conveyor belt uses an inductive charging coil (or an antenna) to obtain the identification data associated with the electronic merchandise 12. Based on this identification data, the conveyor belt is automatically configured to transport the electronic merchandise 12 to its designated display/charging placement 28 on the charging platform 14.

Identification data strings (for example, singulated identification numbers) across different manufacturers of electronic merchandise 12 may have different formats and various digits or characters may have different designations. For example, Manufacturer A may use the last three digits of the singulated identification number to designate the color of the electronic merchandise 12, while Manufacturer B may use the last three digits to identify the battery capacity. To harmonize singulated identification numbers across manufacturers, these numbers may be converted into a unitary identification numbering system.

In an embodiment, the charging platform 14 may be configured to identify battery specifications of the electronic merchandise 12 based on their identification data. Battery specification may include battery type, storage capacity, number of cells, etc. Based on this information, the charging platform 14 may be configured to automatically perform smart voltage cutoff, whereby the inductive coil 16 in the charging platform 14 will be configured to cease supplying power to the electronic merchandise 12 when its battery charge reaches a designated level configured to optimize longevity of the battery as maintaining the battery charge level at 100% may be detrimental to the battery lifespan and ability hold charge over time. Hence, the smart voltage cutoff feature may be configured to charge the battery of the electronic merchandise 12 only up to the designated charge limit, at which point the inductive charging coil 16 will stop supplying power to the electronic merchandise 12.

Furthermore, the anti-theft device 10 may be configured to use wireless connection between the indicative coil 16 of the electronic merchandise 12 and the inductive coil 18 of the charging platform 14 to transfer payload data therebetween. Thus, the charging platform 14 may be configured to download data from the electronic merchandise 12 and/or upload data or provide commands to the electronic merchandise 12. For example, when an electronic merchandise 12 is returned to its designated charging placement 28 after a customer interaction, the inductive coil 16 of the charging platform 14 may issue a command to the electronic merchandise 12 directing it to delete all photographs stored thereon during a preceding customer interaction. In this manner, when subsequent customers pick up the electronic merchandise 12, they will not see the photographs that previous customer might have taken while testing the camera of the electronic merchandise 12. In an embodiment, the anti-theft device 10 may be configured to issue substantially simultaneous commands to multiple articles of electronic merchandise 12 positioned on the charging platform 14. For example, in case of a mass theft threat, the anti-theft device 10 may instruct, via the wireless connections between inductive coils 16 and 18, all electronic merchandise 12 to lock, wipe, self-disable, etc. Furthermore, this feature may be used to upload data such as firmware updates and/or application files to the electronic merchandise 12 via a network connection or to download data from the electronic merchandise 12 via the network connection. The electronic merchandise 12 may be configured to establish the network connection via a local router (e.g., Wi-Fi) or via a cellular or satellite infrastructure. In addition, the electronic merchandise 12 may communicate information pertaining to the actions taken during customer interaction—for example, which software applications (apps) were opened, or which buttons were pressed.

In an embodiment, a software application is preinstalled on the electronic merchandise 12. If the anti-theft device 10 fails to successfully verify that the identification data string wirelessly obtained from the electronic merchandise 12 matches the pre-programmed identification data string associated with the charging platform 14, the anti-theft device 10 may be configured to transmit a command to the electronic merchandise 12, triggering the software application preinstalled thereon to output a visual or audible alarm indicating that the electronic merchandise 12 has not been returned to its designated charging platform 14.

In addition, charging platform 14 may be used to keep track of the number of times each electronic merchandise 12 positioned thereon has been picked up by a consumer and/or the duration of each customer interaction. This data may provide valuable insight about popularity and demand for various articles of electronic merchandise 12. This data can be used to optimize retail stores, both in terms of the types of articles of electronic merchandise 12 on the display and their specific arrangement. Furthermore, these insights can be used to predict demand for specific electronic merchandise 12 and intelligently manage inventory.

As explained above, the inductive coil 16 of the charging platform 14 may be configured to establish bilateral communication with the inductive coil of the electronic merchandise 12, thus enabling the charging platform 14 to transmit data and commands to the electronic merchandise 12. In an embodiment, this feature can be used to diagnose and troubleshoot electronic merchandise 12. For example, the charging platform 14 may be configured to send a command to the electronic merchandise 12 resetting its Wi-Fi, cellular data, roaming, accessibility, or other commonly misconfigured settings. In this manner, many common problems that users experience with their electronic gadgets can be quickly and efficiently resolved by simply requiring a customer to place their electronic gadget onto the charging platform 14. Moreover, because the charging platform 14 can identify the exact manufacturer and model of the electronic gadget, the troubleshooting commands can be tailored specifically to that electronic gadget. This troubleshooting capability has far-reaching applications, including “quick-repair” automated kiosks placed in airports, libraries, restaurants, etc. In an embodiment, the troubleshooting feature may be used to generate revenue by charging a customer’s credit card or mobile service account for the repair.

In an embodiment, to remove the electronic merchandise 12 from the charging platform 14, a fob may be required to deactivate the alarm 26 and initiating a customer-interaction timer. In some embodiments, the electronic merchandise 12 may be secured to the charging platform 14 using a mechanical or electromechanical restraint mechanism. In such embodiments, the fob may be used to actuate the release of the electronic merchandise 12 from the restraint mechanism to enable consumer interaction. In addition to releasing the electronic merchandise 12 for customer interaction, the fob may also be used to receive the data from the charging platform 14 regarding activity pertaining to the electronic merchandise 12: for example, number of times that the electronic merchandise 12 has been lifted for customer interactions, durations of customer interactions, etc. When the fob is subsequently placed on a designated dock, this data can be uploaded from the fob to an administrator system. In addition to downloading data from the charging platform 14, the fob may be configured to upload a firmware update, computer code, or to trigger a designated command that the charging platform 14 delivers to the electronic merchandise 12 via the wireless connection between the inductive coils 16 and 18 (or antennas). In addition, the mechanical restrain mechanism may be configured to close in response to a successful verification of the identification data string obtained from the electronic merchandise 12.

In an embodiment, the electronic merchandise 12 may be checked out by store personnel to customer for a timed interaction. To check out the electronic merchandise 12, it may be placed on a designated device ("puck") equipped with an inductive coil. The inductive coil of the puck receives the identification data from the electronic merchandise 12 and initiates a customer interaction timer. When the customer returns the electronic merchandise 12 to the store personnel, the electronic merchandise 12 is again placed onto the puck. Upon confirming that the electronic merchandise 12 has the correct identification data, the puck turns off the customer interaction timer. Otherwise, if the correct electronic merchandise 12 is not timely returned, the puck may be configured to produce an alarm. In another embodiment, as an additional security layer, the puck may be configured to be attached to the electronic merchandise 12 for the duration of the customer interaction.

Figure 3:
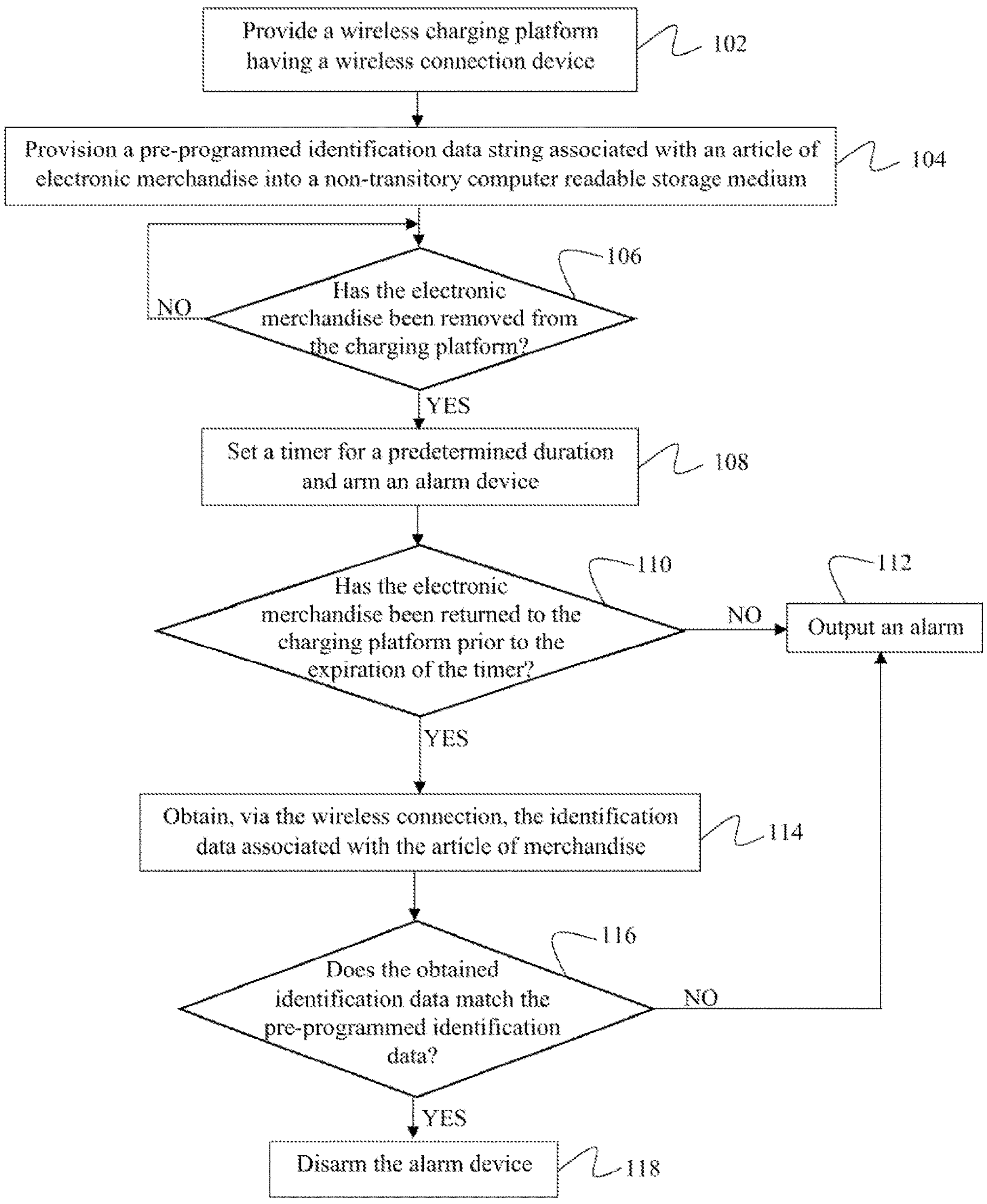
FIG. 3 is a flowchart illustrating an embodiment of a method of securing electronic merchandise against theft using an anti-theft device having a wireless merchandise identification function.

The method of securing an article of electronic merchandise 12 against theft using the anti-theft device 10 is schematically depicted in FIG. 3. In step 102, the wireless charging platform 14 having a wireless connection device 16 (e.g., an inductive coil or an antenna) is provided, whereby the wireless charging platform 14 can be deployed in a retail store. In step 104, the identification data string associated with the article of electronic merchandise 12 is provisioned into a non-transitory computer-readable storage medium 22. In step 106, the processor 20 of the anti-theft device 10 monitors the wireless connection between the wireless connection device 16 of the charging platform 14 and the corresponding wireless connection device 18 of the electronic merchandise 12. This monitoring step continues until the electronic merchandise 12 is removed from the charging platform 14, and the wireless connection between wireless connection devices 16 and 18 is lost.

In step 108, upon detecting removal of the electronic merchandise 12 from the charging platform 14, a timer is set for a predefined duration allocated for an authorized customer interaction with the electronic merchandise 12, and the alarm device 26 is armed. In step 110, the processor 20 monitors the wireless connection device 16 to determine whether the wireless connection device 16 has reestablished a wireless connection, thereby indicating that some article of merchandise having a wireless connection device has been placed onto the charging platform 14. If the wireless connection device 16 does not reestablish a wireless connection prior to the expiration of the predefined duration set on the timer, the alarm device 26 may be instructed to output an alarm in step 112.

If the processor 20 detects that the wireless connection device 16 within the charging platform 14 has reestablished a wireless connection, then the method proceeds to step 114. In step 114, the wireless connection device 16 obtains identification data from the electronic merchandise placed onto the charging platform 14. In step 116, the processor 20 compares the obtained identification data with the pre-programmed identification data provisioned into the non-transitory computer-readable medium 22. If the obtained identification data matches the pre-programmed identification data, the verification step is successful, and the method proceeds to step 118, in which the alarm device 26 is disarmed. Otherwise, if the obtained identification data does not match the pre-programmed identification data (which would indicate that the electronic device placed onto the charging platform 14 is not the article of electronic merchandise 12), then the verification step will be unsuccessful, and the alarm device 26 may output an alarm in step 112.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A method of securing an article of electronic merchandise against theft, the method comprising:

providing an anti-theft device having a support platform and a restraint mechanism configured to secure the article of electronic merchandise to the support platform, the support platform having a first wireless connection device disposed therein, wherein the support platform is configured to wirelessly obtain data from the article of electronic merchandise;

provisioning a pre-programmed identification data string into a non-transitory computer-readable storage medium, wherein the pre-programmed identification data string is associated with the article of electronic merchandise being secured;

responsive to the article of electronic merchandise being removed and subsequently replaced onto the support platform, establishing a wireless connection between the first wireless connection device and the article of electronic merchandise;

obtaining by the first wireless connection device, via the wireless connection, an identification data string from the article of electronic merchandise;

verifying whether the identification data string wirelessly obtained from the article of electronic merchandise corresponds to the pre-programmed identification data string provisioned into the non-transitory computer-readable storage medium; and responsive to successfully verifying that the identification data string wirelessly obtained from the article of electronic merchandise matches the pre-programmed identification data string, automatically actuating the restraint mechanism to secure the article of electronic merchandise to the support platform.

2. The method of claim 1, wherein the first wireless connection device is a first inductive coil configured to establish the wireless connection with a second inductive coil housed within the article of electronic merchandise, and wherein the first inductive coil is configured to wirelessly supply electrical power to the article of electronic merchandise and wirelessly obtain the identification data string therefrom.

3. The method of claim 1, wherein the first wireless connection device is a first antenna configured to establish the wireless connection with a second antenna disposed within the article of electronic merchandise.

4. The method of claim 3, wherein the first antenna and the second antenna are configured to communicate with one another using a near-field communication (NFC) protocol, a short-range wireless communication protocol, an ultra-wideband (UWB) protocol, a low-power, wide area networking (LoRaWAN) protocol, a radio frequency identification (RFID) protocol, or a sub-gigahertz radio technology.

5. The method of claim 1, further comprising: responsive to the article of electronic merchandise being removed from the support platform, initiating a timer set for a predefined duration, wherein the alarm device is configured to output an alarm signal if the identification data string of the article of electronic merchandise is not successfully verified prior to expiration of the predefined duration.

6. The method of claim 1, wherein the identification data string encodes a manufacturer, a model, or a characteristic of the article of electronic merchandise.

7. The method of claim 1, further comprising: determining a battery specification of the article of electronic merchandise based on the identification data string and adapting electrical power wirelessly supplied thereto based on the battery specification.

8. The method of claim 1, wherein the first wireless connection device is configured to transmit a command to the article of electronic merchandise via the wireless connection, the command configured to trigger the article of electronic merchandise to perform a function.

9. The method of claim 8, wherein the function is selected from a group consisting of deleting a file, initiating an update, changing a setting, launching an application, uploading data via a network connection, and downloading data via the network connection.

10. The method of claim 8, wherein the command is transmitted responsive to determining that the identification data string wirelessly obtained from the article of electronic merchandise does not match the pre-programmed identification data string, and wherein the function triggered by the command is outputting a visual or an audible signal.

11. The method of claim 1, wherein the first wireless connection device is configured to wirelessly receive or transmit data to the article of electronic merchandise.

12. The method of claim 1, wherein the support platform comprises a light source configured to emit a light in response to the first wireless connection device establishing or losing the wireless connection with the article of electronic merchandise.

13. The method of claim 12, wherein the light source is configured to emit a first color light or a first flashing pattern in response to successfully verifying that the identification data string wirelessly obtained from the article of electronic merchandise corresponds to the pre-programmed identification data string, or wherein the light source is configured to emit a second color light or a second flashing pattern in response to determining that the identification data string wirelessly obtained from the article of electronic merchandise does not correspond to the pre-programmed identification data string.

14. The method of claim 1, further comprising tracking time elapsed from removal of the article of electronic merchandise from the support platform until the article of electronic merchandise is replaced onto the support platform.

15. The method of claim 1, further comprising tracking a quantity of instances of the article of electronic merchandise being removed from the support platform.

16. An anti-theft device for securing an article of electronic merchandise, comprising:

a support platform configured to support the article of electronic merchandise thereon;

a restraint mechanism for securing the article of electronic merchandise to the support platform;

a first wireless connection device disposed within the support platform, wherein the first wireless connection device is configured to obtain an identification data string from the article of electronic merchandise via a wireless connection;

a non-transitory computer-readable medium having a pre-programmed identification data string stored thereon associated with the article of electronic merchandise;

a processor communicatively coupled to the non-transitory computer-readable medium and to the first wireless connection device, wherein the processor is configured to verify whether the identification data string wirelessly obtained from the article of electronic merchandise corresponds to the pre-programmed identification data string; and wherein responsive to successfully verifying that the identification data string wirelessly obtained from the article of electronic merchandise matches the pre-programmed identification data string, the processor is configured to actuate the restraint mechanism to secure the article of electronic merchandise to the support platform.

17. The anti-theft device of claim 16, wherein the first wireless connection device is a first inductive coil configured to establish the wireless connection with a second inductive coil disposed within the article of electronic merchandise.

18. The anti-theft device of claim 16, wherein the first wireless connection device is a first antenna configured to establish the wireless connection with a second antenna disposed within the article of electronic merchandise.

19. The method of claim 18, wherein the first antenna and the second antenna are configured to communicate with one another using a near-field communication (NFC) protocol, a short-range wireless communication protocol, an ultra-wideband (UWB) protocol, a low-power, wide area networking (LoRaWAN) protocol, a radio frequency identification (RFID) protocol, or a sub-gigahertz radio technology.

20. The anti-theft device of claim 16, wherein responsive to the first wireless connection device losing the wireless connection with the article of electronic merchandise, a timer is initiated for a predefined duration, wherein the alarm device is configured to output an alarm signal if the identification data string of the article of electronic merchandise is not successfully verified prior to expiration of the predefined duration.

21. The anti-theft device of claim 16, wherein the identification data string encodes a manufacturer, a model, or a characteristic of the article of electronic merchandise.

22. The anti-theft device of claim 16, wherein a battery specification of the article of electronic merchandise is determined based on the identification data string, and wherein electrical power wirelessly supplied to the article of electronic merchandise is adapted based on the battery specification.

23. The anti-theft device of claim 16, further comprising a light source configured to emit a light in response to the first wireless connection device establishing or losing the wireless connection with the article of electronic merchandise.

24. The anti-theft device of claim 23, wherein the light source is configured to emit a first color light or a first flashing sequence in response to successfully verifying that the identification data string wirelessly obtained from the article of electronic merchandise corresponds to the pre-programmed identification data string, or wherein the light source is configured to emit a second color light or a second flashing sequence in response to determining that the identification data string wirelessly obtained from the article of electronic merchandise does not correspond to the pre-programmed identification data string.

25. The anti-theft device of claim 16, wherein the first wireless connection device is configured to wirelessly receive or transmit data or a command to the article of electronic merchandise.

26. The anti-theft device of claim 25, wherein the command is configured to cause the article of electronic merchandise to execute a function selected from a group consisting of deleting a file, initiating an update, changing a setting, launching an application, uploading data via a network connection, and downloading data via the network connection.

27. The method of claim 25, wherein the command is transmitted responsive to determining that the identification data string wirelessly obtained from the article of electronic merchandise does not match the pre-programmed identification data string, and wherein the command triggers the article of electronic merchandise to output a visual or audible signal.

* * * * *